United States Patent [19]

Anvari

[11] Patent Number: 5,461,646
[45] Date of Patent: Oct. 24, 1995

[54] SYNCHRONIZATION APPARATUS FOR A DIVERSITY RECEIVER

[75] Inventor: Kiomars Anvari, Walnut Creek, Calif.

[73] Assignee: TCSI Corporation, Berkeley, Calif.

[21] Appl. No.: 428,848

[22] Filed: Apr. 25, 1995

Related U.S. Application Data

[63] Continuation of Ser. No. 174,712, Dec. 29, 1993, abandoned.

[51] Int. Cl.$^6$ .............................. H04B 7/10; H04L 1/02
[52] U.S. Cl. ...................... 375/347; 375/267; 375/324; 455/137; 455/278.1
[58] Field of Search ................................ 375/324, 326, 375/267, 340, 346, 347, 348, 349; 455/134, 135, 137–139, 272, 273, 278.1

[56] References Cited

U.S. PATENT DOCUMENTS

| | | | |
|---|---|---|---|
| 4,584,534 | 4/1986 | Lijphart et al. | |
| 4,873,683 | 10/1989 | Borth et al. | |
| 5,109,392 | 4/1992 | McDonald | 375/100 |
| 5,128,969 | 7/1992 | Baghdady | 375/100 |
| 5,142,534 | 8/1992 | Simpson et al. | 370/95.1 |
| 5,214,390 | 5/1993 | Montreuil | |
| 5,349,609 | 9/1994 | Tsujimoto | 375/100 |

OTHER PUBLICATIONS

A. Higashi et al., NTT Radio Communication Systems Lab., "BER Performance of Mobile Equalizer Using RLS Algorithm in Selective Fading Environment".

S. Sampei, "Development of Japanese Adaptive Equalizing Technology Toward High Bit Rate Data Transmission in Land Mobile Communications", IEICE Transactions, vol. E 74, No. 6, Jun. 1991.

Y. Liu, "Bi–Directinal Equalization Technique for TDMA Communication Systems over Land Mobile Radio Channels", pp. 1458–1462, Globecom '91.

Primary Examiner—Stephen Chin
Assistant Examiner—Don N. Vo
Attorney, Agent, or Firm—Ronald L. Yin; Limbach & Limbach

[57] ABSTRACT

A diversity combiner for a digital receiver receives a plurality of complex baseband signals ($S_1(t)$, $S_2(t)$) each having an associated receive signal strength-intensity signal ($RSSI_1$, $RSSI_2$). The combiner differentially detects each of the complex baseband signals ($S_1(t)$, $S_2(t)$) to produce a plurality of differential signals ($RX_1(t)$, $RX_2(t)$) in accordance with:

$$RX_1(t) = S_1(t) \cdot S_1^*(t-T), \text{ and}$$

$$RX_2(t) = S_2(t) \cdot S_2^*(t-T)$$

where $S_x^*$ is the complex conjugate of $S_x$ and T is a symbol delay. The differential signals ($RX_1(t)$, $RX_2(t)$) are processed to produce a selected differential signal $R(t)$. The selected differential signal $R(t)$ is converted to produce a plurality of converted signals $D_1(t)$ and $D_2(t)$ in accordance with:

$$D_1(t) = R(t) \cdot e^{-j2\pi f_s t}$$

$$D_2(t) = R(t) \cdot e^{+j2\pi f_s t}$$

The converted signals $D_1(t)$ and $D_2(t)$ are further processed to produce timing ($\tau$) and frequency ($f_e$) error estimates by:

$$\tau = \frac{T}{4\pi} \cdot \arctan(C_1^*(t) \cdot C_{-1}(t))$$

$$f_e = \frac{1}{4\pi T} \cdot \arctan(C_{-1}(t) \cdot C_1(t))$$

where $C_1(t)$ and $C_{-1}(t)$ are the averages of $D_1(t)$ and $D_2(t)$ respectively.

18 Claims, 7 Drawing Sheets

SYNCHRONIZATION APPARATUS FOR A DIVERSITY RECEIVER

This is a continuation of application Ser. No. 08/174,712 filed on Dec. 29, 1993, now abandoned.

TECHNICAL FIELD

The present invention relates to a method and an apparatus for combining a plurality of complex baseband signals generated by a receiver receiving a plurality of RF encoded digital signals, and more particularly, to a receiver for receiving such wireless transmitted electromagnetic signal.

BACKGROUND OF THE INVENTION

Wireless communication is well known in the art. Heretofore, one type of wireless communication is known as a "cellular" communication wherein each stationary unit receives and transmits signals to mobile units within its allocated geographical region, called a cell. As mobile units move from one cell to another, communication is transferred from one stationary unit in one cell to another stationary unit in another cell.

Heretofore, cellular communication is analog based and has risen in popularity. However, as a result, the airways have become increasingly crowded and the capacity of the communication system to take on new subscribers is becoming increasingly of a problem. Digital cellular communication offers an opportunity to increase the number of subscribers to operate within the cellular system.

One of the problems of a digital wireless communication system is the non-linearity of the channel. Another problem is the equalizing of the digitally encoded signals. As the digitally encoded signal is transmitted from one unit to another, through a multiplicity of data paths, the various signals arriving at the other unit can cause delay spread between the digitally encoded signals. This produces inter-symbol interference. An equalizer is a digital hardware/software apparatus which corrects inter-symbol interference between the digitally encoded signals arriving from a plurality of signal paths.

In the prior art, a number of equalization strategies is disclosed. See, for example, "BER Performances Of Mobile Radio Equalizer Using RLS Algorithm In Selective Fading Environment" by Akihiro Higashi, Hiroshi Suzuki; "Bi-Directional Equalization Technique For TDMA Communication Systems Over Land Mobile Radio Channels" by Yow-Jong, Liu, page 1458–1462, Globecom '91; and "Development Of Japanese Adaptive Equalization Technology Toward High Bit Rate Data Transmission In Land Mobile Communications" by Seiichi Sampei, page 1512–1521 IEICE Transactions, Volume E, 74, No. 6, June, 1991.

In a multi-path fading environment the signal arriving at a receiver is composed of several signals, each of which corresponds to the transmitted signal following a distinct path from the transmitter to the receiver. In a time varying channel, the multi-path combinations of the transmitted signal at the receiver produce a signal whose amplitude is time varying and experiences fading due to destructive combining of the received signals. For digital transmission, the multi-path fading of the channel results in substantially larger average values of the Bit Error Rate (BER) when compared to a non-faded channel operating at the same average Signal to Noise Ratio (SNR). Therefore, to achieve a given average BER value in a fading channel the required SNR value is substantially higher than that required in a non-faded channel.

In environments where the modulated carrier is subject to fast multi-path fading, conventional continuous time synchronization techniques cannot be performed satisfactorily. In time domain multiple access systems where each user is assigned one time slot the receiver has to perform its timing and frequency synchronization in a slot by slot basis. Frequency synchronization is usually achieved by automatic frequency control circuits which have some inherent frequency error. Therefore, the timing recovery circuit or algorithm has to accommodate some limited amount of frequency error without significant degradation in performance.

Heretofore, to reduce the effects of fading, i.e. to reduce the required SNR values for given BER targets, signal diversity at the receiver has been considered. A receiver is provided with two or more independently faded versions of the same transmitted signal. By so doing, the probability that all the faded signals suffer large attenuations simultaneously is reduced resulting in lower detection error probability.

Several timing recovery techniques have been disclosed in the prior art. They can be classified into four categories. In the first category the threshold crossings of the received baseband data signal are compared with the sampling phase. A correction of the sampling phase is initiated as a result of this comparison. The main location of the crossings is estimated and the optimum sampling instant is assumed to be halfway between these crossings. The second technique uses the spectral line at the clock frequency or multiple of this frequency. This frequency is filtered out with a narrow band filter. The third technique is the sample-derivative system. In this technique a sampled-derivation phase detector which generates an error signal during each symbol interval proportional to the time derivative of the signal at the sampling time multiplied by the signal polarity at that time is used. The sampling derivative timing recovery system attempts to set the sampling time to coincide with the peak of the signal. Finally, in the fourth technique, a bank of all pass filters is used as a timing phase detector. This technique is suitable for the signals whose frame structure contains a synchronization field.

Fast multipath fading severely degrades the average BER performance of digital land mobile radio transmission systems. In order to achieve highly reliable digital data transmission without excessively increasing both transmitter power and co-channel reuse distance, it is well known to use diversity reception.

A diversity technique requires a number of signal transmission paths, named diversity branches, all of which carry the same information but have uncorrelated multipath fadings, and a circuit to combine the received signals into one which can be decoded reliably. Depending upon the land mobile radio propagation characteristics, there are a number of methods to construct diversity branches. Generally, they are classified into the following five categories: (1) space, (2) angle, (3) polarization, (4) frequency, and (5) time diversity.

Space diversity, which has been the most widely used because it can be implemented simply and economically, comprises a single transmitting antenna and a number of receiving antennas. Space between adjacent receiving antennas is chosen so that multipath fading appearing in each diversity branch becomes uncorrelated with that of the other branch.

SUMMARY OF THE INVENTION

The present invention relates to a method of processing a plurality of complex baseband signals ($S_1(t)$, $S_2(t)$) where each of the signals has an associated RSSI signal ($RSSI_1$, $RSSI_2$), generated by a receiver. The receiver receives a plurality of wireless transmitted electromagnetic signals and has associated signal processing means for generating the plurality of complex baseband signals ($S_1(t)$, ($S_2(t)$) and the associated RSSI signals ($RSSI_1$, $RSSI_2$). The method comprises differentially detecting each of the complex baseband signals ($S_1(t)$, ($S_2(t)$) to produce a plurality of differential signals $RX_1$, $RX_2$ in accordance with $$RX_1(t) = S_1(t) \cdot S_1^*(t-T) \text{ and}$$

$$RX_2(t) = S_2(t) \cdot S_2^*(t-T)$$

where $S_x^*$ is the complex conjugate of $S_x$ and T is symbol period delay. The differential signals ($RX_1(t)$, $RX_2(t)$) are combined to form a selected differential decoded signal $R(t)$, depending upon whether the complex baseband signals ($S_1(t)$, ($S_2(t)$) have amplitude components of the associated RSSI signals ($RSSI_1$, $RSSI_2$) restored.

The selected differential decoded signal $R(t)$ is converted to produce a plurality of converted signals $D_1(t)$ and $D_2(t)$ in accordance with:

$$D_1(t) = R(t) \cdot e^{-j2\pi f_s t}$$

$$D_2(t) = R(t) \cdot e^{+j2\pi f_s t}$$

Each of the converted signals $D_1(t)$ and $D_2(t)$ is processed to produce a timing ($\tau$) and frequency ($f_e$) error estimate signals by:

$$\tau = \frac{T}{4\pi} \cdot \arctan(C_1^*(t) \cdot C_{-1}(t))$$

$$f_e = \frac{1}{4\pi T} \cdot \arctan(C_{-1}(t) \cdot C_1(t))$$

where $C_1(t)$ and $C_{-1}(t)$ are the averages of $D_1(t)$ and $D_2(t)$ respectively.

An apparatus for achieving the foregoing method is also disclosed.

DETAILED DESCRIPTION OF THE DRAWINGS

Figure 1:
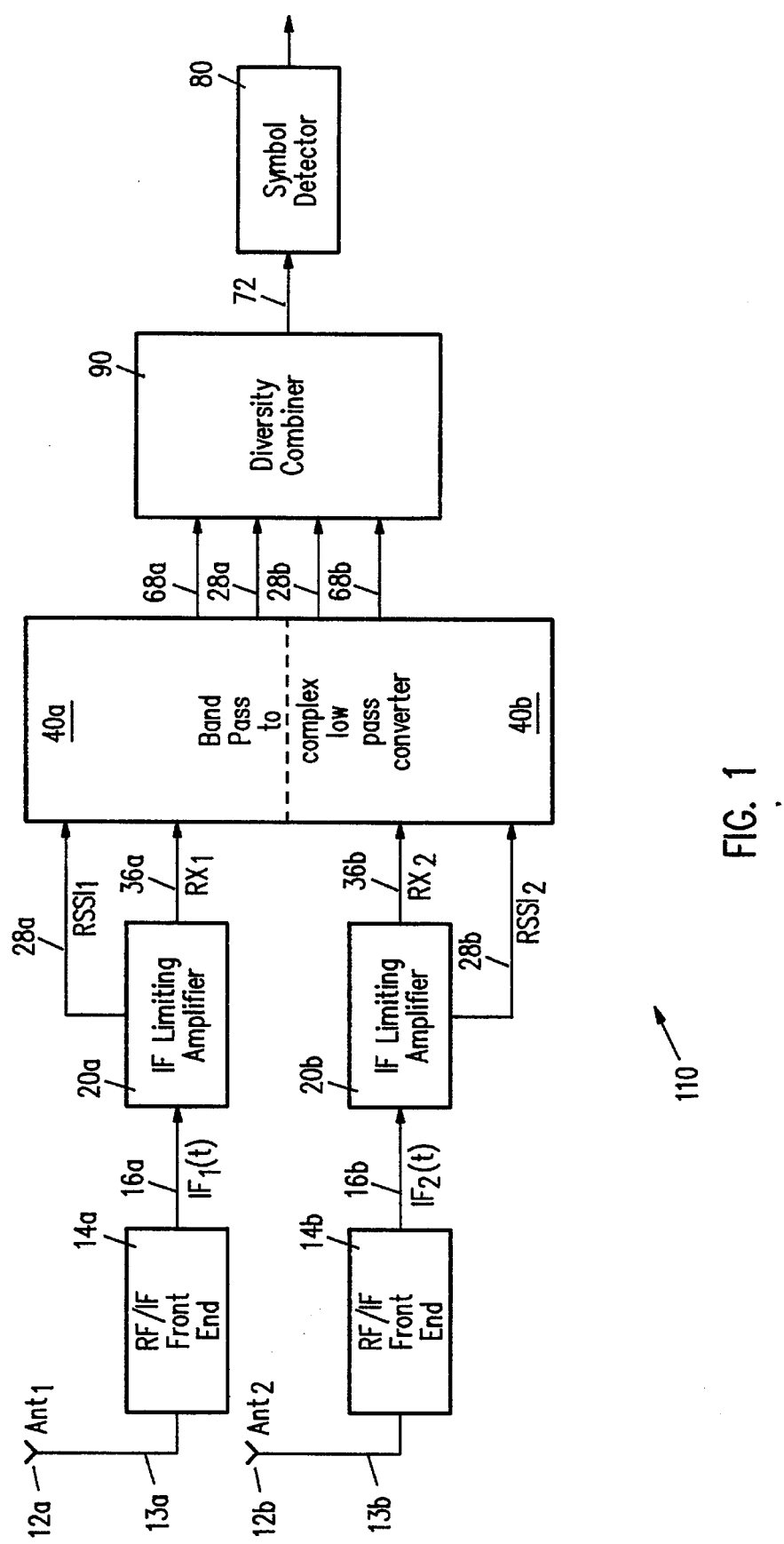
FIG. 1 is a block level diagram of an embodiment of a wireless digital receiver having a plurality of spaced-apart antennas to receive the transmitted electromagnetic signal to generate a plurality of complex baseband signals and incorporating a diversity combiner.

Referring to FIG. 1 there is shown a schematic block level diagram of one embodiment of a digital receiver 10. In a wireless communication system between a mobile unit and a stationary unit, the digital receiver 10 can be a portion of a mobile unit or a portion of the stationary unit. More particularly, as will be appreciated by those having ordinary skill in the art, the stationary unit would comprise additional units to accomplish functions such as hands off and the ability to process many remote units at the same time. In the preferred embodiment, the digital receiver 10 receives wireless electromagnetic radiation signals in the radio frequency band to effectuate digital cellular communication.

The digital receiver 10 in the embodiment shown in FIG. 1, comprises a plurality of antennas 12a and 12b, (in this case two are used) to achieve space diversity. The plurality of spaced apart antennas 12a and 12b serve to detect simultaneously the RF transmitted signal. Thus, there are two signal channels for the simultaneous processing of the two received RF signals 13a and 13b. In the first channel, a first antenna 12a receives the wireless transmitted signal and converts it into a first RF signal 13a. An RF processing unit 14a receives the first RF signal 12a and generates a first $IF_1(t)$ signal 16a in response. The first RF processing unit 14a is well known in the art.

The first $IF_1(t)$ signal 16a in the first channel is supplied to a first IF amplifier 20a which generates an amplitude limited amplified IF signal $RX_1(t)$ 36a. In addition, the amplifier 20 generates a first receive signal strength intensity $RSSI_1$ signal 28a, which also varies with time, because it follows the envelope of the received first signal 16a. The first amplitude limited IF signal $RX_1(t)$ 36a and the first $RSSI_1$ signal 28a are supplied to a bandpass to complex low pass converter 40a. The bandpass to complex low pass converter 40a generates a first complex baseband signal 68a.

In the second channel, the second antenna 12b receives the same electromagnetic signal in the radio frequency spectrum and converts it into a second RF signal 13b. The second RF signal 13b is supplied to a second RF processing unit 14b to generate a second $IF_2(t)$ signal 16b.

The second IF signal $IF_2(t)$ 16b in the second channel is supplied to a second IF amplifier 20b which generates a second amplitude limited amplified IF signal $RX_2(t)$ 36b, and a second RSSI signal $RSSI_2$ 28b. The second amplifier 20b is substantially similar to the first amplifier 20a. The second amplitude limited IF signal $RX_2(t)$ 36b and the second $RSSI_2$ signal 28b are supplied to a second channel of a bandpass to complex low pass converter 40b. The bandpass to complex low pass converter 40b generates a second complex baseband signal 68b.

The first complex baseband signal 68a and the second complex baseband signal 68b are supplied to a diversity combiner 90. Since a plurality of spaced apart antennas are used to receive a plurality of RF signals 13a and 13b to achieve space diversity, the two channels of complex baseband signals 68a and 68b are combined by a diversity combiner 90 to generate a single output signal eliminating flat fading. This signal is then supplied to the symbol detector 80. The symbol detector 80 detects the symbols from the digital signal supplied as input thereto.

Figure 2:
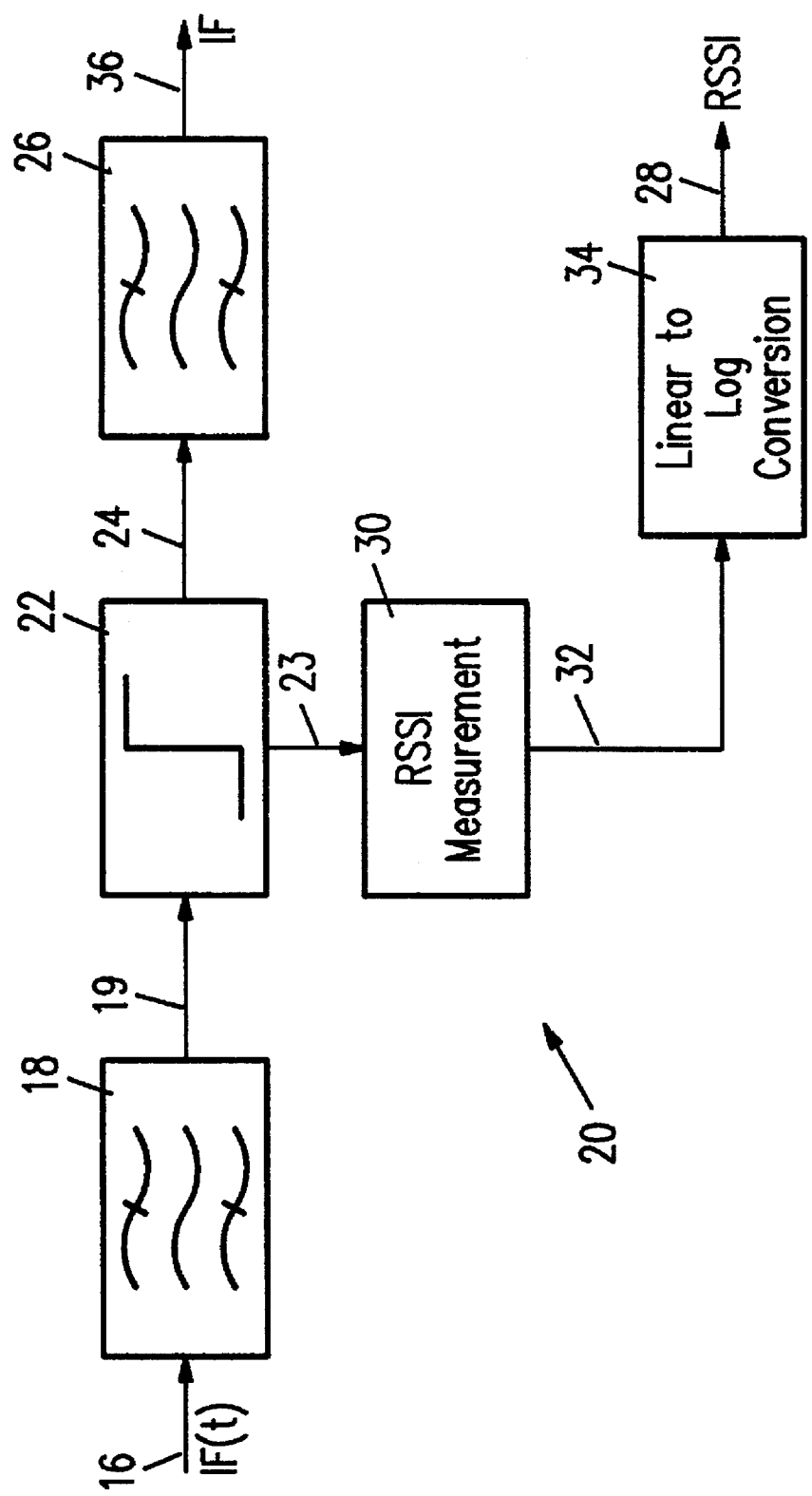
FIG. 2 is a block level diagram of an intermediate frequency (IF) amplitude limited amplifier which can be used in the receiver shown in FIGS. 1, to produce an amplitude limited IF signal and an RSSI signal.

Referring to FIG. 2 there is shown a block level diagram of the IF amplifier 20 used in the receiver 10, as either the first amplifier 20a or the second amplifier 20b. The IF limiting amplifier 20 receives the IF signal 16a or 16b and supplies it through a first bandpass filter 18. The first bandpass filter 18 provides match filtering for the IF signal 16 to minimize any intersymbol interference. It also provides the selectivity for rejecting any unwanted signal. The first bandpass filter 18 generates a first IF filtered signal 19.

The first IF filtered signal 19 is supplied to a limiting amplifier 22 which acts almost like an instant automatic gain control amplifier. The amplifier 22 removes any amplitude fluctuation in the first IF filtered signal 19 and produces an amplified IF signal 24 as its output. Mathematically, the amplified IF signal $S_2(t)$ 24 is related to the first filtered IF signal $S_1(t)$ 19 in the following manner:

$$S_2(t) = \frac{S_1(t)}{|S_1(t)|}$$

Thus, the amplified IF signal $S_2(t)$ 24 is a vector signal with a constant magnitude and a phase that changes according to the input modulating IF filtered signal $S_1(t)$ 19. The amplified IF signal 24 results in spectrum regrowth and spreading.

Finally, the amplified IF signal 24 is supplied to a band pass filter 26. The band pass filter 26 confines the IF signal 24 in a manageable bandwidth, depending on the number of samples used in the analog to digital converter 48a and 48b of FIG. 3 or A/D converter 148, and 58 of FIG. 4, as explained hereinafter.

The amplifier 22 also supplies an RSSI signal 23 which is supplied to an RSSI measurement circuit 30. The RSSI measurement circuit 30 generates an RSSI signal 32 which is proportional to the envelope of the IF signal 19 supplied to the amplifier 22. The RSSI signal 32 is then converted by a linear to low conversion circuit 34 into a log RSSI signal 28, to reduce the requirement for the dynamic range of the analog-to-digital converter 58, which is used to digitize the RSSI signal (as discussed hereinafter). The log RSSI signal 28 continues to maintain the envelope information of the IF signal 19 but in logarithmic format. In contrast, the amplitude limited IF amplified signal 36 will no longer have any envelope information.

Figure 3:
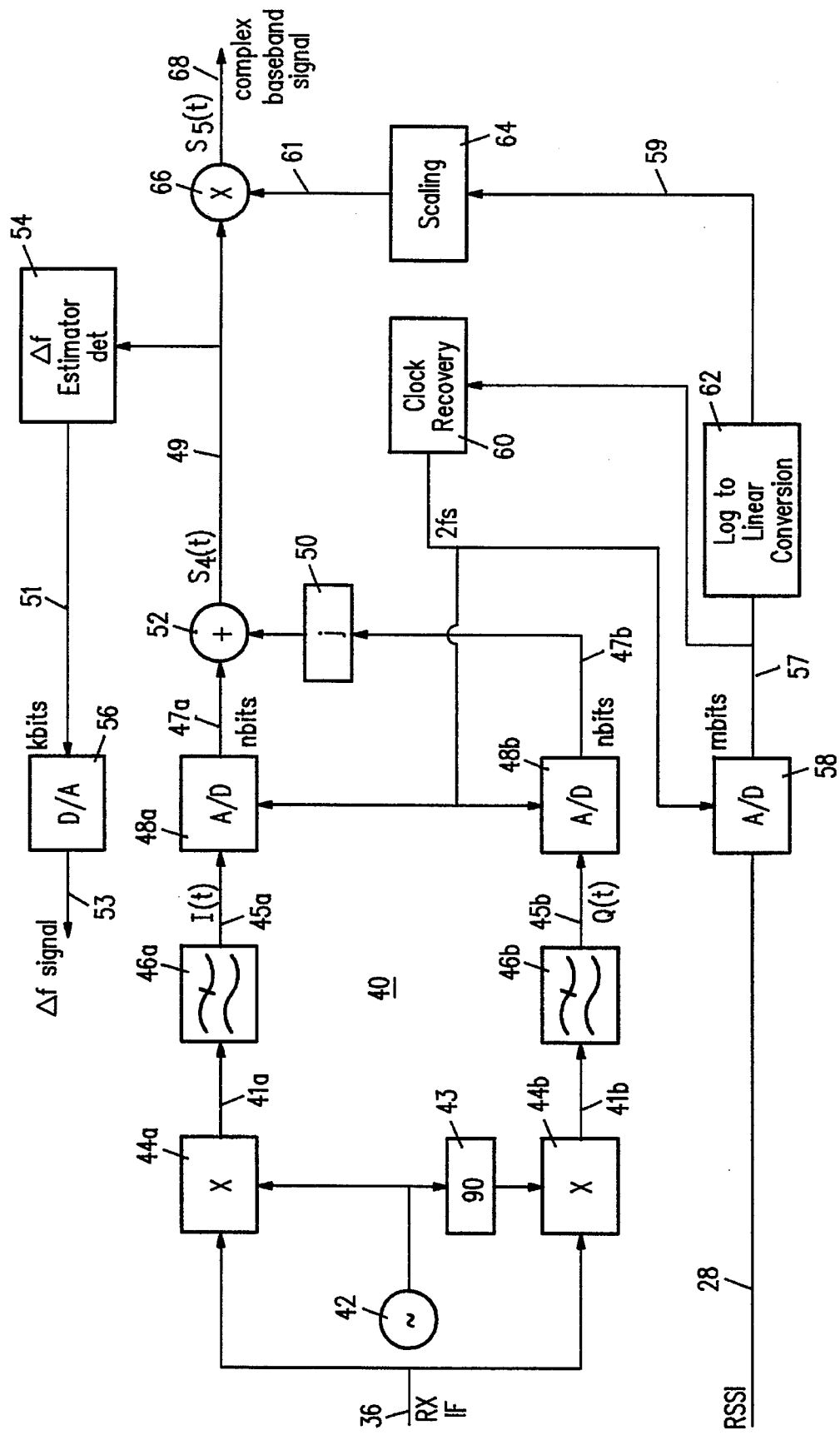
FIG. 3 is a detailed block diagram of one embodiment of a bandpass to complex low pass converter which can be used in the receiver shown in FIGS. 1.

Referring to FIG. 3 there is shown one embodiment of the bandpass to complex low pass converter 40. The converter 40 shown in FIG. 3 is a quadrature demodulator which is used to convert the IF signal 36 to a complex baseband signal 68. The manner in which this is accomplished is as follows. The IF signal 36 is first demodulated. A carrier signal at the reference IF frequency is generated by a generator 42. The carrier signal is supplied to a first multiplier 44a to which the IF signal 36 is also supplied to demodulate the IF signal 36 to produce a first demodulated IF signal 41a. The first IF demodulated signal 41a is filtered by a first low pass filter 46a to produce a first real baseband signal I(t) 45a. The baseband signal I(t) 45a is then digitized by a first analog-to-digital converter 48a to produce a digitized I(t) signal 47a.

Figure 10:
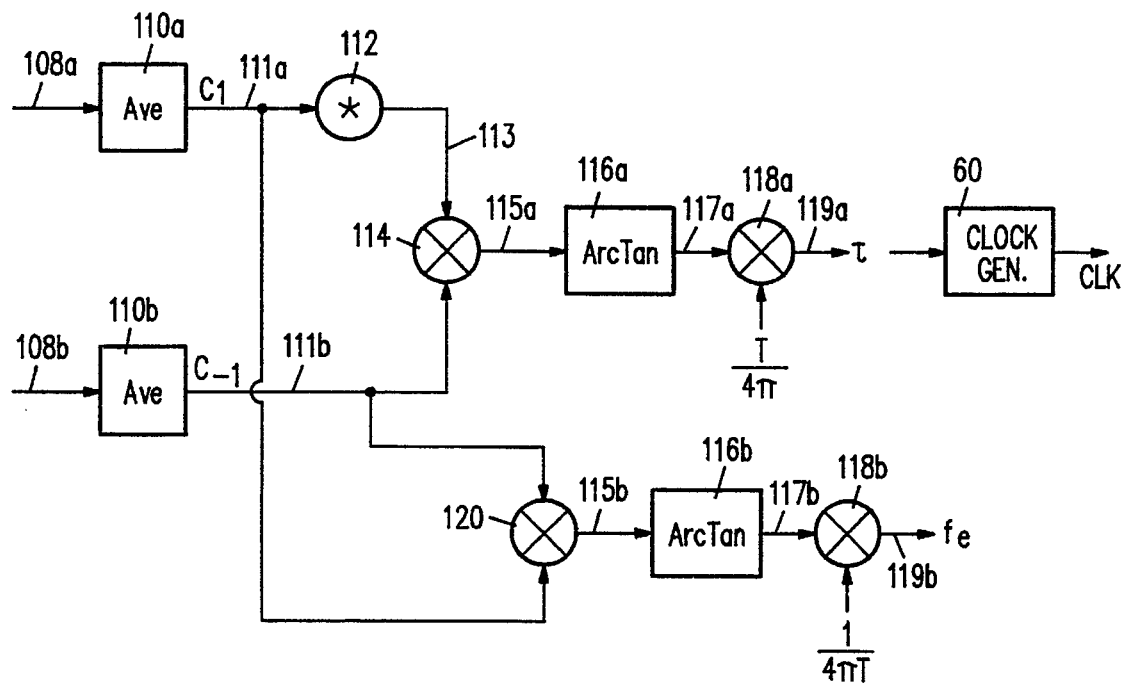
FIG. 10 is a detailed block diagram of the estimator shown in FIG. 7.

The IF signal 36 is also supplied to a second multiplier 44b. The carrier signal generating the reference IF frequency from the generator 42 has its phase shifted by 90° by phase shifter 43. The phase shifted carrier signal is then supplied to the second multiplier 44b which produces a second IF demodulated signal 41b, which is filtered by a low pass filter 46b to produce a filtered real baseband signal Q(t) 45b. The real baseband Q(t) signal 45b is then digitized by a second A/D converter 48b, sampling at the same sampling rate as that for the first A/D converter 48a, based upon a clock signal CLK from the clock 60 (shown in FIG. 10), to produce a digitized real Q signal 47b. Each of the real I and Q digitized signals 47a and 47b comprises a digital sample signal having n bits. The real Q digitized signal 47b is then multiplied by the imaginary vector j by multiplier 50. The signal is then supplied to an adder 52 which generates the complex baseband signal $S_4(t)$ 49 which is:

$$S_4(t) = I(t) + jQ(t) \quad I^2(t) + Q^2(t) = \text{constant}$$

The complex signal 49 contains the phase of the IF signal 28 but does not carry any amplitude information.

The RSSI signal 28 is supplied to a third A/D converter 58 which is also sampled at the clock rate of CLK, the same sampling rate as the rate of the clock signal supplied to the first and second A/D converters 48a and 48b respectively. The first, second, and third A/D converters 47a, 47b and 58 respectively are sampled by the clock signal CLK at greater than equal to twice the expected symbol rate. The digitized log RSSI signal 57 is supplied to a log to linear converter 62 which converts the digitized RSSI signal 57 back to a linear digital RSSI signal 59. The linear digitized RSSI signal 59 is then scaled by a scaling circuit 54, if needed, generating a scaled digitized RSSI signal 61. The scaled digitized RSSI signal 61 is supplied to a multiplier 66 to which the complex baseband signal $S_4(t)$ 49 is also supplied and is combined in the following manner:

$$S_5(t) = S_4(t) \times \text{RSSI}$$

To form the linear complex baseband signal 68.

The converter 40 as described hereinabove and as shown in FIG. 3 can be used in each of the channels in the receiver 10 shown in FIG. 2.

Figure 4:
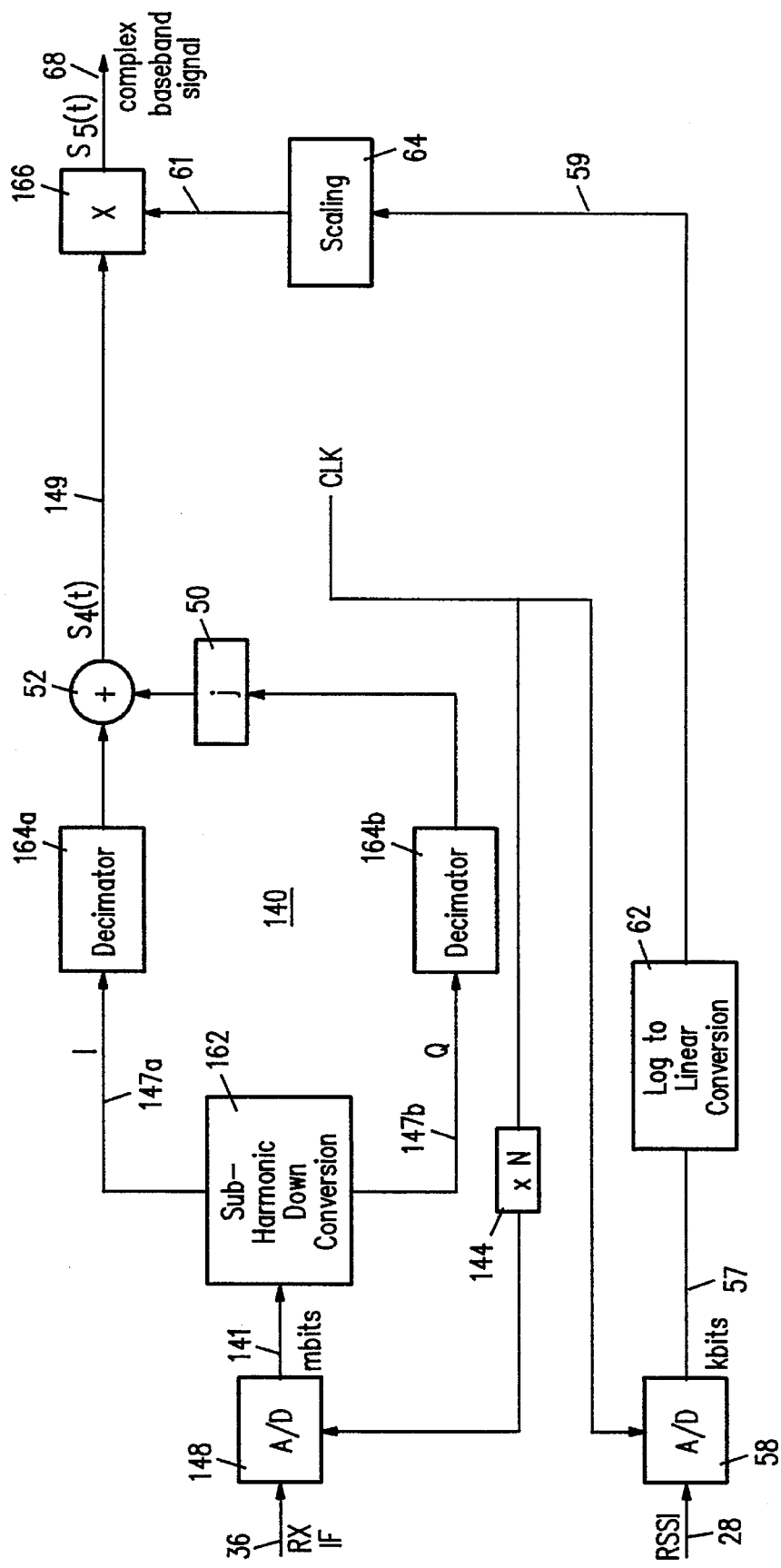
FIG. 4 is a detailed block diagram of another embodiment of a bandpass to complex low pass converter which can be used in the receiver shown in FIG. 1.
Figure 5:
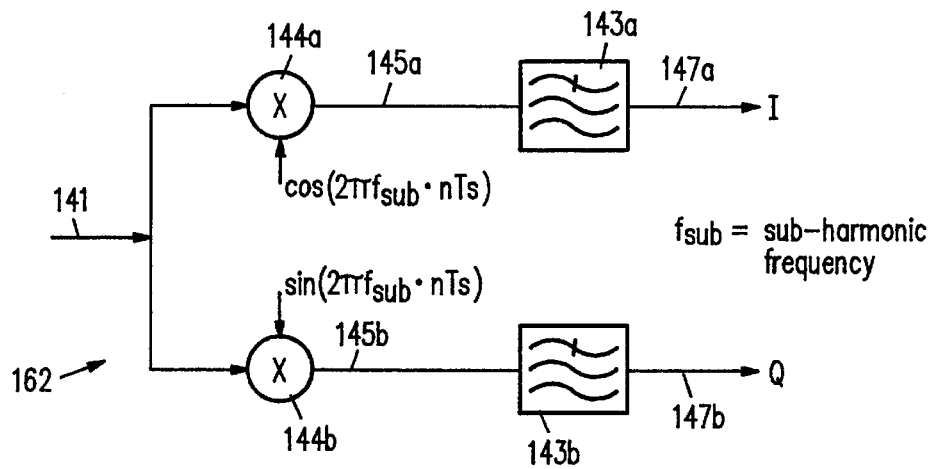
FIG. 5 is a detailed block diagram of the subharmonic down conversion portion of the circuit for the embodiment of the bandpass to complex low pass converter shown in FIG. 4.

Referring to FIG. 4 there is shown another embodiment of a converter 140 which can be used in each of the two channels of the receiver 10 shown in FIG. 1. The converter 140 shown in FIG. 4 is similar to the converter 40 shown in FIG. 3 having many of the same components. The IF signal 36, received by the converter 140, is converted into a digital signal by a first A/D converter 148. The first A/D converter 148, however, receives the clock signal CLK increased by a multiplier 144. The result is that the clock signal supplied to the A/D converter 148 samples the IF signal 28 at a rate at least four (4) times the symbol rate. The rate of at least four times the symbol rate is chosen depending upon the bandwidth and the frequency of the IF signal 36. The result is a digitized IF signal 141, which is supplied to a sub-harmonic down converter 162, which is shown in FIG. 5 and will be explained in greater detail hereinafter. The digitized IF signal 141, in digital format, is down converted (rather than demodulated, as in the case of an analog IF signal, in FIG. 3) to produce the baseband I and Q signals 147a and 147b, respectively. Each of the baseband signals I and Q, 147a and 147b respectively is applied to a decimator 164a and 164b, respectively, which performs the function of decimation, which decreases the number of samples per symbol. Lowering the number of samples per symbol decreases the processing power required. Decimation is not needed if the number of samples per symbol is the minimum required for correct processing of the signal. The output of the second decimator 164b, the real Q baseband signal is converted into an imaginary vector signal by the imaginary vector 50. The resultant signal jQ(t) from the vector 50, is supplied to an adder 52 to which the I real baseband signal has also been supplied. The output of the adder 52 is the complex baseband signal $S_4(t)$ 149 which is as follows:

$$S_4(t)=I(t)+jQ(t)I^2(t)+Q^2(t)=\text{constant}$$

The complex baseband signal 149 is then supplied to a multiplier 166.

The RSSI signal 28 is supplied to a second A/D converter 58 which is sampled at the sampling rate by the clock signal CLK. The sampling rate is greater than twice the symbol rate and therefore can be slower than the rate of sampling of the A/D converter 148. The output of the second A/D converter 58 is a digitized RSSI signal 57. The digitized log RSSI signal 57 is converted back to linear format by the log to linear converter 62. The resultant linear digitized RSSI signal 59 is then supplied to a scaler 64, again, if needed. Finally, the scaled, linear, digitized RSSI signal 61 is then supplied to the multiplier 166 which generates the output complex baseband signal 68.

Similar to the description for FIG. 3, since the amplitude limited IF signal 36 contains only the phase of the modulating signal and does not carry any amplitude information, in order to reconstruct the complex baseband signal 68, the envelope information of the modulating signal which is contained in the RSSI signal 28 is used to restore the envelope information of the complex baseband signal 68. Furthermore, with the embodiment of the converter 140 shown in FIG. 4, the converter 140 is less complex than the converter 40 shown in FIG. 3. Thus, it is more suitable for integration. In addition, it eliminates some of the problems inherent with quadrature demodulators used in the embodiment of the converter 40 shown in FIG. 3. Finally, gain and phase imbalance, DC offset, and carrier feed through are some of the other problems which can be avoided by sampling and digitizing the modulated IF signal 36, rather than the demodulated baseband signals.

Referring to FIG. 5, there is shown one embodiment of the down converter 162 used in the converter 140. The sampled digitized IF signal 141 is supplied to a first multiplier 144a and a second multiplier 144b simultaneously. Each of the first and second multipliers 144a and 144b operates in the signal provided as follows:

signal 145a=Signal 141* Cos $(2\pi f_{sub}*t)$ signal 145b=Signal 141* Sin $(2\pi f_{sub}*t)$ where $f_{sub}$ is the sub-harmonic frequency, t=nTs, where Ts is the sampling period, and n is determined by the periodicity of:

$f_{sub}*nTs=1$; or $n=1/(f_{sub}*Ts)$

Each of the outputs of the multipliers 144a and 144b is then passed through a low pass filter 143a, and 143b, respectively, to form the baseband signals I and Q 147a and 147b, respectively.

Figure 6:
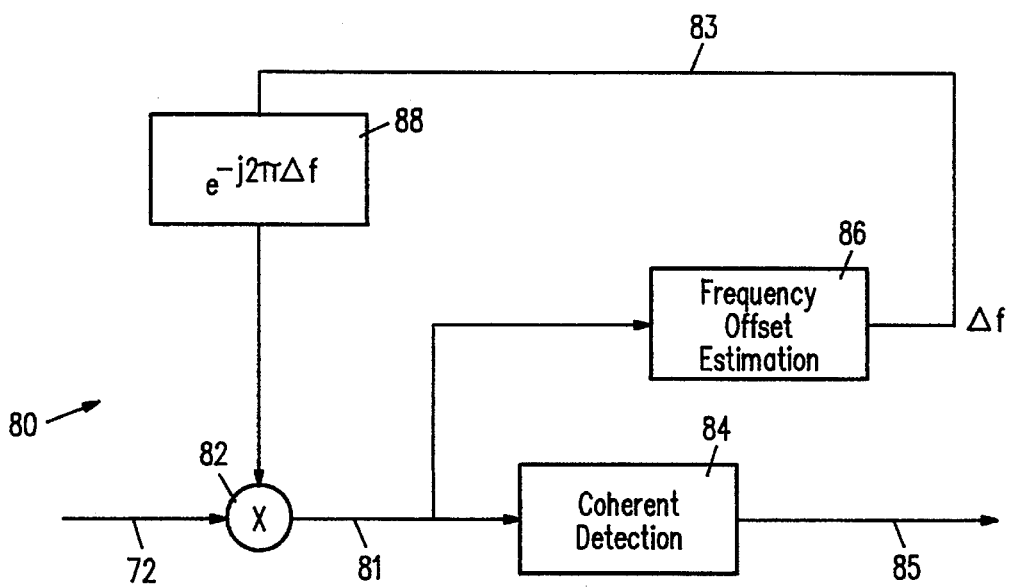
FIG. 6 is a detailed block diagram of the symbol detector which can be used in the receiver shown in FIG. 1.

Referring to FIG. 6 there is shown one embodiment of a symbol detector 80. The complex baseband signal 72 from the diversity combiner 90 is supplied to a multiplier 82 to which a signal $e^{-j2\pi\Delta f}$ is supplied from the circuit 88. This multiplication removes any frequency offset from the complex baseband signal 72. The result is a complex baseband signal 81 whose frequency offset has been removed. This signal 81 is then supplied to a frequency offset estimation circuit 86 which generates a frequency differential signal 83 or $\Delta f$. The frequency differential signal 83 $\Delta f$ is supplied to the circuit 88 which generates the signal $e^{-j2\pi\Delta f}$. In addition, the signal 81 is supplied to a coherent detector 84. The coherent detector 84 detects the symbols in the signal 81 coherently. The result of the output of the symbol detector 80 is data symbols or bits.

The two complex baseband signals 68a and 68b which are the outputs of the bandpass converters 40a and 40b or 140a and 140b are supplied to a diversity combiner 90.

Figure 7:
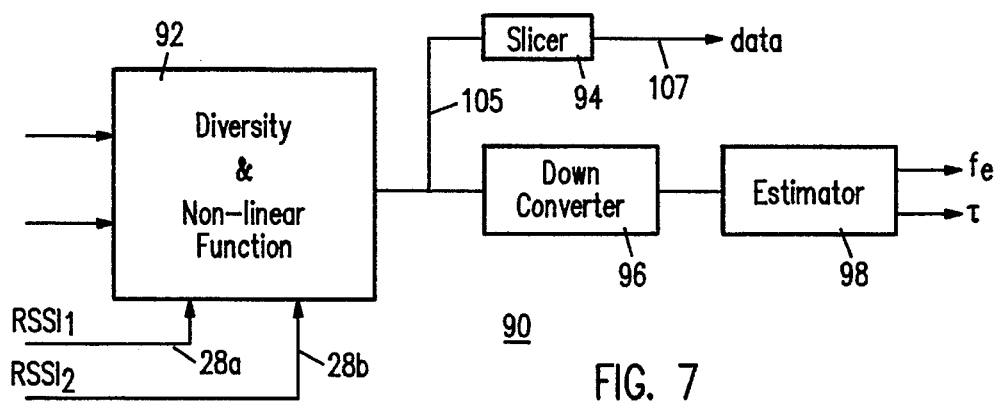
FIG. 7 is a detailed block diagram of the diversity combiner used in the receiver shown in FIG. 1.

Referring to FIG. 7 there is shown an embodiment of a diversity combiner 90 which can be used with the receiver 10. The diversity combiner 90 comprises a diversity and non-linear function circuit 92, which can be one of two embodiments, shown in greater detail in FIGS. 8A and 8B and discussed hereinafter.

Figure 8A:
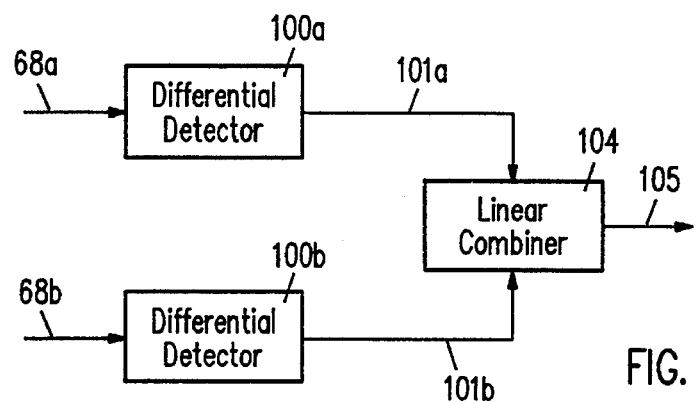
FIG. 8A is a detailed block diagram of one embodiment of the diversity and non-linear function circuit portion of the combiner shown in FIG. 7.
Figure 11:
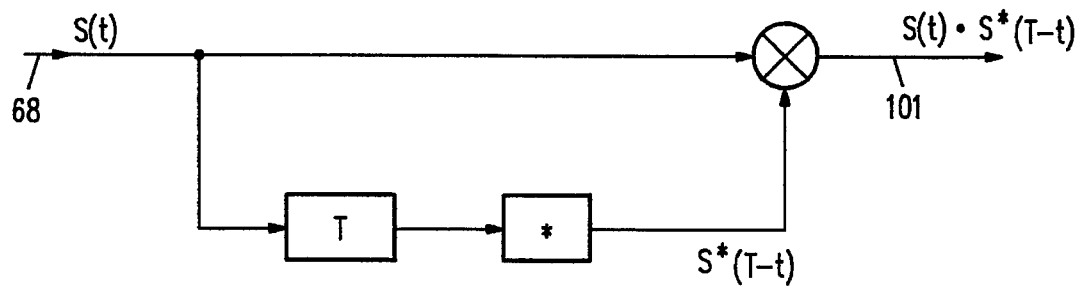
FIG. 11 is a detailed block diagram of the differential detector shown in FIG. 8A or 8B.

In the embodiment shown in FIG. 8A, the diversity and non-linear function circuit 92 receives the complex baseband signal 68a and 68b, which already have their amplitude envelope restored by the RSSI signal. Each of the complex baseband signals 68a and 68b is supplied to a differential detector 100a and 100b respectively to generate a differential signal 101a and 101b, respectively. The differential detectors 100a and 100b are of conventional design and one such embodiment is shown in FIG. 11. Each differential detector 100 receives the complex baseband signal 68 (S(t)) and generates the differential signal 101 in accordance with signal 101=S(t)*S*(t−T)

where T is a symbol delay. The differential signals 101a and 101b are supplied to a linear combiner 104, which merely adds together the two signals 101a and 101b. The output of the combiner 104 is the combined complex baseband signal 105.

Figure 8B:
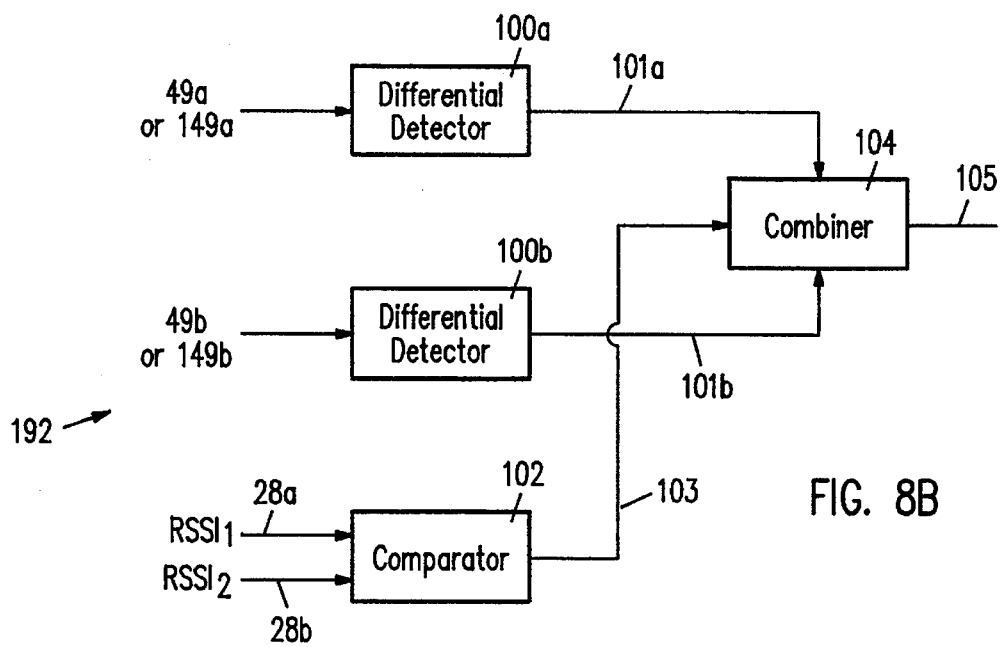
FIG. 8B is a detailed block diagram of another embodiment of the diversity and non-linear function circuit portion of the combiner shown in FIG. 7.

Referring to FIG. 8B there is shown another embodiment of the diversity and non-linear function circuit 192. The circuit 192 receives the complex baseband signal 49a and 49b or 149a and 149b, signals which do not have their amplitude envelope restored by the RSSI signal. Each of the complex baseband signals 49a and 49b or 149a and 149b is supplied to a differential detector 100a and 100b respectively to generate a differential signal 101a and 101b, respectively. The differential detectors 100a and 100b are of conventional design and one such embodiment is shown in FIG. 11. Each differential detector 100 receives the complex baseband signal and generates the differential signal 101 in accordance with signal 101=S(t)*S*(t−T), where T is a symbol delay. The differential signals 101a and 101b are supplied to a combiner 104. The output of the combiner 104 is a combined complex baseband signal 105.

Since the complex baseband signals 49a and 49b or 149a and 149b do not have their amplitude envelope restored by the RSSI signal, the RSSI signals are also supplied to the circuit 192. The RSSI signals 36a and 36b associated with each complex baseband signal 49a and 49b or 149a and 149b, respectively, are supplied to a comparator 102. The comparator 102 generates a comparison signal 103 supplied to the combiner 104 to chose the combined complex signal 105 as one of the following:

Possibility A. Complex baseband signal 101a from one of the channels.

Possibility B. Complex baseband signal 101b from the other channel.

Possibility C. The sum of the complex baseband signal 101a and 101b.

The manner in which the comparator 102 generates the comparison signal 103 which selects the particular signal from the combiner 104 is as follows:

If $RSSI_1-RSSI_2>5$ dB choose signal 101a

If $RSSI_2-RSSI_1>5$ dB choose signal 101b.

If $|RSSI_1-RSSI_2|<5$ db choose signal 101a plus 101b

The combined complex baseband signal 105, from either the circuit 92 or the circuit 192, is then supplied to a slicer 94 which looks at the phase of its input signal and establishes which quadrant it is in, to generate the data signal 107. The slicer 94 is well known in the art.

Figure 9:
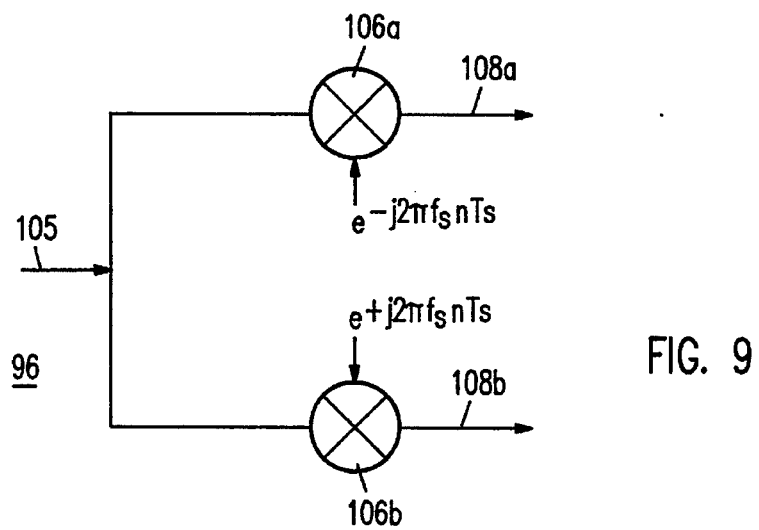
FIG. 9 is a detailed block diagram of the down converter shown in FIG. 7.

The combined complex baseband signal 105 is also supplied to a down converter 96, shown in FIG. 9. The converter 96 receives the combined complex baseband signal 105 and supplies it to two multipliers 106a and 106b simultaneously. Each of the multipliers 106a and 106b is supplied with the signal $e^{-j2\pi fst}$ and $e^{+j2\pi fst}$ respectively, with the parameters fs, and t, all as previously discussed. The output of the multipliers 106a and 106b are the signals 108a and 108b, respectively. The function of the down converter is to complex demodulate the component of interest to a DC level.

The two component signals 108a and 108b are supplied to signal averagers 110a and 110b, respectively, generating a first average signal 111a and a second average signal 111b. The first average signal 111a is converted into a complex conjugate signal by the complex operator 112, to generate a first complex signal 113. The first complex signal 113 and the second average signal 111b are supplied to a multiplier 114 which generates a first multiplied signal 115a. The first multiplied signal 115 is operated upon by the arctangent operator 116a to generate a first arctangent signal 117a. The first arctangent signal 117a is supplied to a second multiplier 118a which multiplies the first arctangent signal 117a by the factor $$\frac{T}{4\pi}$$

to produce the timing error signal τ 119a. The timing error signal τ 119a is supplied to a clock generator 60 to adjust the sampling phase of the clock signal CLK, generated by the clock generator 60.

The first average signal 111a and the second average signal 111b are supplied to a second multiplier 120 which produces a second multiplied signal 115b. The second multiplied signal 115a is operated upon by a second arctangent operator 116b to generate a second arctangent signal 117b. The second arctangent signal 117b is supplied to a fourth multiplier 118b to which the term $$\frac{1}{4\pi T}$$

is also supplied. The result of the operation by the fourth multiplier 118b is the frequency error signal $f_e$ 119b. The frequency error signal $f_e$ 119b is converted by a digital-to-analog converter (not shown), to produce an AFC (Automatic Frequency Control) signal to adjust the frequency of the receiver 10.

In the preferred embodiment, the foregoing description is implemented by a digital signal processor executing appropriate software. In addition, the receiver 10 can be used to detect both analog FM and digital modulation formats such as FSK, CPFSK, and DPSK.

What is claimed is:

1. A method of processing a plurality of complex baseband signals ($S_1(t), S_2(t)$) generated by a receiver for receiving a plurality of wireless transmitted electromagnetic signals, and associated signal processing means for generating said plurality of complex baseband signals ($S_1(t), (S_2(t)$), said method comprising:

differentially detecting each of said complex baseband signals ($S_1(t), S_2(t)$) to produce a plurality of differential signals ($RX_1(t), RX_2(t)$) in accordance with $RX_1(t)=S_1(t)\cdot S_1*(t-T)$, and $RX_2(t)=S_2(t)\cdot S_2*(t-T)$ where $S_x*$ is the complex conjugate of $S_x$ and T is a symbol delay;

generating a selected differential signal R(t) from said differential signals ($RX_1(t), RX_2(t)$);

converting said selected differential signal R(t) to produce a plurality of converted signals $D_1(t)$ and $D_2(t)$ in according with;

$D_1(t)=R(t)\cdot e^{-j2\pi fst}$ $D_2(t)=R(t)\cdot e^{+j2\pi fst}$ where fs is the sub-harmonic frequency, t=nTs, where Ts is the sampling period, and n is determined by the periodicity of:

$fs*nTs=1$; or $n=1/(fs*Ts)$;

processing said converted signals $D_1(t)$ and $D_2(t)$ to produce timing (τ) and frequency ($f_e$) error estimates by:

$$\tau = \frac{T}{4\pi} \cdot \text{arc tan } (C_1*(t) \cdot C_{-1}(t))$$

$$f_e = \frac{1}{4\pi T} \cdot \text{arc tan}(C_{-1}(t) \cdot C_1(t))$$

where $C_1(t)$ and $C_{-1}(t)$ are the averages of $D_1(t)$ and $D_2(t)$ respectively.

2. The method of claim 1 wherein each of said plurality of complex baseband signals ($S_1(t), S_2(t)$) has an associated receive signal strength-intensity signal ($RSSI_1, RSSI_2$), generated by said associated signal processing means of said receiver.

3. The method of claim 2 wherein said generating step further comprises:

selecting said differential signal R(t) from said differential signals ($RX_1(t), RX_2(t)$) based upon the comparing step:

When $RSSI_1 - RSSI_2 >$ first dB,
   $R(t) = RX_1(t)$

When $RSSI_2 - RSSI_1 >$ first dB,
   $R(t) = RX_2(t)$

When $|RSSI_1 - RSSI_2| <$ first dB,
$$R(t) = RX_1(t) + RX_2(t)$$

in the event each of said plurality of complex baseband signals ($S_1(t)$, $S_2(t)$) is an amplitude limited signal.

4. The method of claim 3 wherein said first db is 5.

5. The method of claim 2 wherein said generating step further comprises:

selecting said differential signal R(t) from said differential signals ($RX_1(t)$, $RX_2(t)$) by linearly combining said differential signals ($RX_1(t)$, $RX_2(t)$) in accordance with $$R(t) = RX_1(t) + RX_2(t)$$

in the event each of said plurality of complex baseband signals ($S_1(t)$, $S_2(t)$) has its amplitude restored by its associated receive signal strength-intensity signal ($RSSI_1$, $RSSI_2$).

6. The method of claim 1 wherein said receiver has a plurality of spaced apart antenna means and associated signal processing means for generating simultaneously said plurality of complex baseband signals ($S_1(t)$, ($S_2(t)$)).

7. A diversity combiner for use with a receiver for receiving a plurality of wireless transmitted electromagnetic signals, said receiver having associated signal processing means for generating a plurality of complex baseband signals ($S_1(t)$, $S_2(t)$), from said plurality of wireless transmitted electromagnetic signals, said diversity combiner comprising:

means for differently detecting each of said complex baseband signals ($S_1(t)$, $S_2(t)$) to produce a plurality of differential signals ($RX_1(t)$, $RX_2(t)$), in accordance with $$RX_1(t) = S_1(t) \cdot S_1^*(t-T), \text{ and}$$
$$RX_2(t) = S_2(t) \cdot S_2^*(t-T)$$

where $S_x^*$ is the complex conjugate of $S_x$ and T is a symbol delay;

means for generating a selected differential signal R(t) from said differential signals ($RX_1(t)$, $RX_2(t)$);

means for converting said selected differential signal R(t) to produce a plurality of converted signals $D_1(t)$ and $D_2(t)$ in according with $$D_1(t) = R(t) \cdot e^{-j2\pi f_s t}$$
$$D_2(t) = R(t) \cdot e^{+j2\pi f_s t}$$

where fs is the sub-harmonic frequency, $t=nTs$, where Ts is the sampling period, and n is determined by the periodicity of:

$$fs*nTs=1; \text{ or } n=1/(fs*Ts); \text{ and}$$

means for processing said converted signals $D_1(t)$ and $D_2(t)$ to produce timing ($\tau$) and frequency ($f_e$) error estimate signals by:

$$\tau = \frac{T}{4\pi} \cdot \arctan(C_1^*(t) \cdot C_{-1}(t))$$

$$f_e = \frac{1}{4\pi T} \cdot \arctan(C_{-1}(t) \cdot C_1(t))$$

where $C_1(t)$ and $C_{-1}(t)$ are the averages of $D_1(t)$ and $D_2(t)$ respectively.

8. The combiner of claim 7 wherein said associated signal processing means of said receiver further comprising means for generating an associated receive signal strength-intensity signal ($RSSI_1$, $RSSI_2$) for each of said plurality of complex baseband signals ($S_1(t)$, $S_2(t)$).

9. The combiner of claim 8 wherein said means for generating a selected differential signal R(t) from said differential signals ($RX_1(t)$, $RX_2(t)$); further comprises:

means for comparing said plurality of receive signal strength-intensity signals ($RSSI_1$, $RSSI_2$) and for selecting said selected differential signal R(t)in accordance with:

When $RSSI_1 - RSSI_2 >$ first dB,
$$R(t) = RX_1(t)$$

When $RSSI_2 - RSSI_1 >$ first dB,
$$R(t) = RX_2(t)$$

When $|RSSI_1 - RSSI_2| <$ first dB,
$$R(t) = RX_1(t) + RX_2(t)$$

in the event each of said plurality of complex baseband signals ($S_1(t)$, $S_2(t)$) is an amplitude limited signal.

10. The combiner of claim 9 wherein said first db is 5.

11. The combiner of claim 8 wherein said means for generating a selected differential signal R(t) from said differential signals ($RX_1(t)$, $RX_2(t)$); further comprises:

means for linearly combining said differential signals ($RX_1(t)$, $RX_2(t)$) in accordance with $$R(t) = RX_1(t) + RX_2(t)$$

in the event each of said plurality of complex baseband signals ($S_1(t)$, $S_2(t)$) has its amplitude restored by its associated receive signal strength-intensity signal ($RSSI_1$, $RSSI_2$).

12. The combiner of claim 7 wherein said receiver has a plurality of spaced apart antenna means and associated signal processing means for simultaneously generating said plurality of complex baseband signals ($S_1(t)$, ($S_2(t)$)).

13. A telecommunication receiver for receiving a wireless transmitted electromagnetic signal, said receiver comprising:

antenna means for receiving said wireless transmitted electromagnetic signals and for converting same to a plurality of radio frequency (RF) signals;

means for converting said plurality of RF signals into a plurality of intermediate frequency (IF) signals each having an amplitude and for limiting the amplitude of each IF signal and for generating a receive signal strength intensity (RSSI) signal associated with each IF signal;

bandpass converting means for receiving said plurality of IF signals and for producing a plurality of complex baseband signals ($S_1(t)$, $S_2(t)$), one associated with each IF signal;

diversity combiner means for receiving said plurality of complex baseband signals ($S_1(t)$, $S_2(t)$), said diversity combiner means comprising:

means for differentially detecting each of said complex baseband signals ($S_1(t)$, $S_2(t)$) to produce a plurality of differential signals ($RX_1(t)$, $RX_2(t)$), in accordance with $$RX_1(t)=S_1(t) \cdot S_1^*(t-T), \text{and}$$

$$RX_2(t)=S_2(t) \cdot S_2^*(t-T)$$

where $S_x^*$ is the complex conjugate of $S_x$ and T is a symbol delay;

means for generating a selected differential signal R(t) from said differential signals ($RX_1(t)$, $RX_2(t)$);

means for converting said selected differential signal R(t) to produce a plurality of converted signals $D_1(t)$ and $D_2(t)$ in according with $$D_1(t)=R(t) \cdot e^{-j2\pi f_s t}$$

$$D_2(t)=R(t) \cdot e^{+j2\pi f_s t}$$

where fs is the sub-harmonic frequency, t=nTs, where Ts is the sampling period, and n is determined by the periodicity of:

$$fs*nTs=1; \text{ or } n=1/(fs*Ts);$$

means for processing said converted signals $D_1(t)$ and $D_2(t)$ to produce timing ($\tau$) and frequency ($f_e$) error estimates by:

$$\tau = \frac{T}{4\pi} \cdot \arctan(C_1^*(t) \cdot C_{-1}(t))$$

$$f_e = \frac{1}{4\pi T} \cdot \arctan(C_{-1}(t) \cdot C_1(t))$$

where $C_1(t)$ and $C_{-1}(t)$ are the averages of $D_1(t)$ and $D_2(t)$ respectively; and means for receiving said timing ($\tau$) and frequency ($f_e$) error estimate signals and for detecting symbols in said selected differential signal R(t).

14. The receiver of claim 13 wherein said band pass converting means of said receiver further comprising means for generating an associated receive signal strength-intensity signal ($RSSI_1$, $RSSI_2$) for each of said plurality of complex baseband signals ($S_1(t)$, $S_2(t)$).

15. The receiver of claim 14 wherein said means for generating a selected differential signal R(t) from said differential signals ($RX_1(t)$, $RX_2(t)$); further comprises:

means for comparing said plurality of receive signal strength-intensity signals ($RSSI_1$, $RSSI_2$) and for selecting said selected differential signal R(t) in accordance with:

When $RSSI_1 - RSSI_2 >$ first dB,
$$R(t) = RX_1(t)$$

When $RSSI_2 - RSSI_1 >$ first dB,
$$R(t) = RX_2(t)$$

When $|RSSI_1 - RSSI_2| <$ first dB,
$$R(t) = RX_1(t) + RX_2(t)$$

in the event each of said plurality of complex baseband signals ($S_1(t)$, $S_2(t)$) is an amplitude limited signal.

16. The combiner of claim 15 wherein said first db is 5.

17. The combiner of claim 14 wherein said means for generating a selected differential signal R(t) from said differential signals ($RX_1(t)$, $RX_2(t)$); further comprises:

means for linearly combining said differential signals ($RX_1(t)$, $RX_2(t)$) in accordance with $$R(t)=RX_1(t)+RX_2(t)$$

in the event each of said plurality of complex baseband signals ($S_1(t)$, $S_2(t)$) has its amplitude restored by its associated receive signal strength-intensity signal ($RSSI_1$, $RSSI_2$).

18. The combiner of claim 13 wherein said antenna means comprises a plurality of spaced apart antennas and said band pass converting means for simultaneously generating said plurality of complex baseband signals ($S_1(t)$, ($S_2(t)$).

* * * * *